United States Patent [19]

Martin

[11] Patent Number: 4,556,129
[45] Date of Patent: Dec. 3, 1985

[54] TRIP MECHANISM FOR DE-ACTIVATING ELEVATOR PLATFORMS

[75] Inventor: John C. Martin, Toronto, Canada

[73] Assignee: Diesel Equipment Limited, Toronto, Canada

[21] Appl. No.: 576,930

[22] Filed: Feb. 6, 1984

[30] Foreign Application Priority Data

Feb. 7, 1983 [CA] Canada .................................. 421050

[51] Int. Cl.⁴ ............................................. B66B 1/00
[52] U.S. Cl. ...................................... 187/41; 187/98; 200/61.44
[58] Field of Search ..................... 187/98, 1 R, 40, 41; 200/61.42, 61.43, 61.44, 161, 153 R, 52 R; 192/129 A, 133

[56] References Cited

U.S. PATENT DOCUMENTS

| 922,607 | 5/1909 | Martineau | 187/40 |
| 1,486,027 | 3/1924 | Mayotte | 187/98 |
| 3,275,170 | 9/1966 | MacRae et al. | 187/9 R |
| 3,801,767 | 4/1974 | Marks | 200/161 |
| 4,002,231 | 1/1976 | Doty | 187/98 |
| 4,091,906 | 5/1978 | Clarke | 192/129 A |
| 4,301,621 | 11/1981 | Houweling | 200/153 F |

FOREIGN PATENT DOCUMENTS

| U7235134 | 9/1972 | Fed. Rep. of Germany . |
| U7833012 | 7/1978 | Fed. Rep. of Germany . |
| 143675 | 6/1920 | United Kingdom . |
| 848803 | 3/1958 | United Kingdom . |
| 1134180 | 11/1968 | United Kingdom . |
| 1393292 | 7/1975 | United Kingdom . |

Primary Examiner—H. Grant Skaggs
Assistant Examiner—Kenneth Noland
Attorney, Agent, or Firm—Fetherstonhaugh & Co.

[57] ABSTRACT

An elevator mechanism device having first and second platforms mounted in a frame for movement relative to one another wherein a nip is formed between a lower edge of the first platform and an upper edge of the second platform as they move toward one another and wherein an electrically operated control circuit is provided for controlling the movement of the platforms relative to one another, the improvement of a flexible skirt extending below the lower edge of said first platform across the width of the nip whereby during movement of the platform to close the nip, a trip will be engaged by and deflected by any object which may project into the nip, a circuit breaker operable to de-activate the control circuit, the trip communicating between each end of the flexible skirt and the circuit breaker to activate the circuit breaker to de-activate control circuit when the trip is deflected to an extent less than that required to permit the object to be clamped between the first and second platforms.

4 Claims, 5 Drawing Figures

TRIP MECHANISM FOR DE-ACTIVATING ELEVATOR PLATFORMS

FIELD OF INVENTION

This invention relates to elevator mechanisms and in particular, a mechanism for preventing nipping of an object between the lift platform and the body of a truck during loading and unloading of a truck.

PRIOR ART

Elevator platforms are commonly used for loading goods on to a truck. A nip is formed between the edge of the loading platform and the edge of the truck body as the loading platform is raised and goods can be damaged and personal injuries can occur when this nip closes on an object.

Various mechanisms have previously been provided in an attempt to prevent clamping of an object within the nip. These prior devices have included deflector plates which are intended to give an early warning or to force the foot of an operator or the like out of the nip. These devices have tended to be expensive and unreliable. In addition, while the prior devices may serve to stop the closing of the nip, difficulty is experienced in attempting to open the nip after the safety device has been activated with the result that in a personal injury situation, the victim may be trapped by the nip and a considerably delay may occur in attempting to release the victim. In some circuits, it is necessary to re-activate the circuit in order to open the nip and on occasion, the re-activated circuit has been used to further close the nip causing further damage rather than to open the nip.

I have overcome the difficulties previously experienced with respect to the complexity of the safety control system by providing a trip mechanism which serves to de-activate the electrical circuit by removing a fuse from the electrical circuit.

According to one aspect of the present invention, there is provided in an elevator mechanism device having first and second platforms mounted in a frame for movement relative to one another wherein a nip is formed between a lower edge of the first platform and an upper edge of the second platform as they move toward one another and wherein an electrically operated control circuit is provided for controlling the movement of the platforms relative to one another, the improvement of a flexible skirt extending below said lower edge of said first platform across the width of said nip whereby during movement of the platform to close the nip, the trip means will be engaged by an deflected by any object which may project into said nip, a circuit breaker means operable to de-activate said control circuit, trip means communicating between each end of the flexible skirt and said circuit breaker means to activate the circuit breaker means to de-activate said control circuit when said trip means is deflected to an extent less than that required to permit said object to be clamped between said first and second platforms.

In order to overcome the difficulties previously experienced in attempting to open the nip after the system has been de-activated, I provide separate hyraulic lift and hydraulic lower circuits and separate first and second electrical control circuits for controlling the operation of the lift and lower hydraulic circuits respectively, and I locate the fuse means which is engaged by the trip means in the first electrical circuit whereby only the first electrical circuit is de-activated when the fuse is de-activated by the trip mechanism.

PREFERRED EMBODIMENT

The invention will be more clearly understood after reference to the following detailed specification read in conjunction with the drawings wherein.

Figure 1:
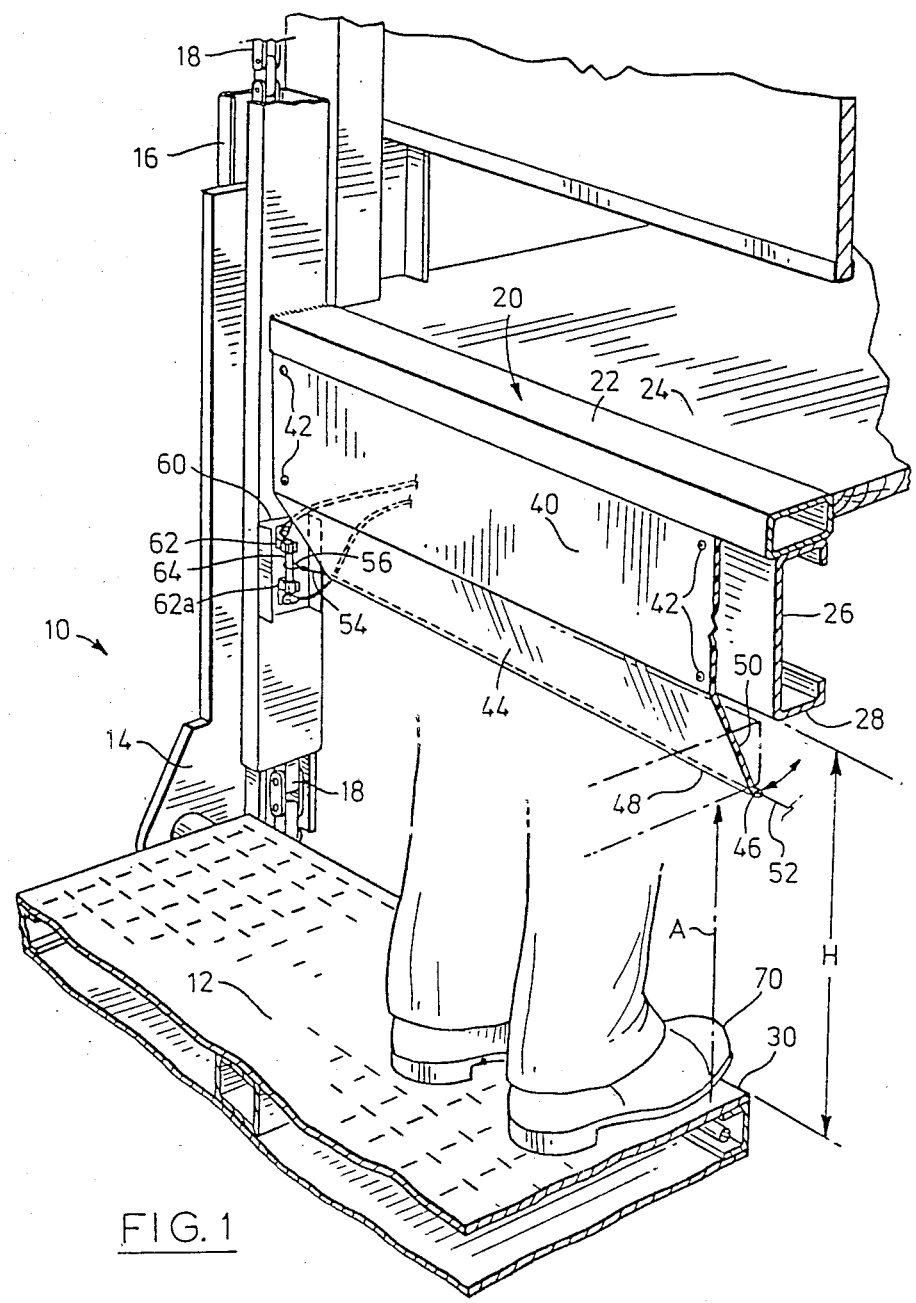
FIG. 1 is a partially sectioned pictorial view of an elevator device according to an embodiment of the present invention.

With reference to FIG. 1 of the drawings, the reference numeral 10 refers generally to a tailgate loader of the type commonly used for raising and lowering loads to and from the bed of a truck or the like. A tailgate loader of this general type is decribed in Canadian Pat. No. 774,964 issued to Diesel Equipment Limited on Jan. 2, 1968.

The tailgate loader 10 consists of a platform 12 which is supported on slides 14 which are mounted in guide rails 16 of the frame 20. Chains 18 connect the platform 12 to an hydraulic ram (not shown) which is a single acting hydraulic cylinder which has a vent valve which is vented to permit the platform to be lowered under its own weight. The hydraulic ram which is operble to raise the platform 12.

The frame 20 has a sill member 22 which is located at the back edge of the bed 24 of a truck or the like. A channel shaped beam 26 extends transversely of the frame 20 below the sill 22, the lower edge 28 of the beam 26. This lower edge 28 forms the lower edge of the stationary platform of the elevator mechanism as a whole. The moveable platform 12 has an edge 30 which, when the platform is lowered is spaced from the edge 28 of the stationary platform a distance H. It is the space between the edge 28 of the stationary platform and the edge 30 of the moveable platform which constitutes the "nip" between the stationary platform and the moving platform.

A panel 40 is secured by means of a plurality of mounting screws 42 to the channel member 26. The panel 40 has a skirt portion 44 which projects downwardly and rearwardly from the lower edge 28. The skirt 44 extends over substantially the full width of the bite 18 between oppositely disposed guide rails 16. The panel 40 is preferably made from a tough resiliently flexible material such as fibreglass or the like. The downwardly and rearwardly inclined face of the skirt 40 serves to deflect any object which it comes in contact with during closing of the nip, outwardly of the nip so that in many instances an obstruction may be removed before the circuit breaker is de-activated. A flexible trip wire 52 is securely embedded in the back face 50 of the skirt 48 in a recess 46 and has free end portions 54 projecting from opposite ends thereof. Each free end portion 54 is formed with a loop 56.

A bracket 60 is mounted on the inner side face of each guide rail 16 and fuse mounting clips 62 and 62a are mounted in each bracket 60. A fuse 64, which consists of a glass body portion 63 and a pair of metal end caps 65, is mounted in the mounting clips 62 and 62a and extends through the loop 56 of the adjacent free end 54 of the trip wire 52. The fuse 64 is located in the electrical control circuit which controls the operation of the hydraulic ram to effect lifting of the platform as will be decribed hereinafter.

Figure 3:
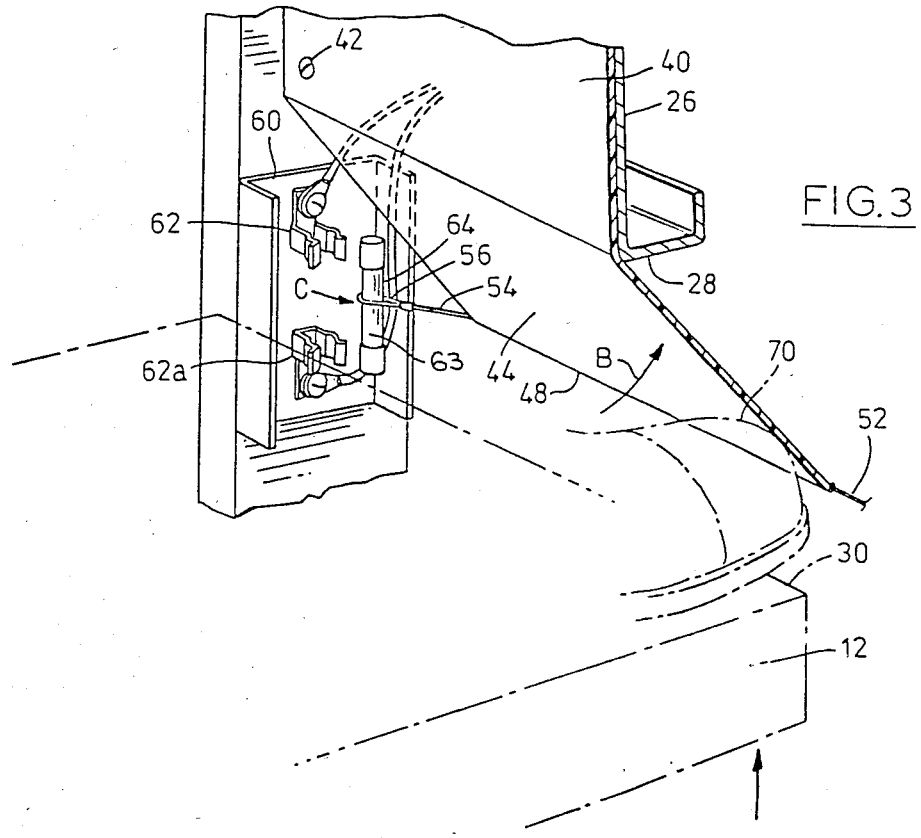
FIG. 3 is a view similar to FIG. 2 showing the fuse being removed by the trip wire.

In use, if any object such as the toe 70 of an operator extends over the edge 30 of the platform, as the platform is raised in the direction of the arrow A (FIG. 1), it will contact the lower edge 48 of the skirt before it is clamped between the platform 12 and the lower edge 28 of the channel member 26. As shown in FIG. 3, if the tow 70 of the operator contacts the skirt 44, the skirt will be deflected rearwardly and upwardly in the direction of the arrow B and this in turn will cause the trip wire 52 to be deflected upwardly and rearwardly. The movement of the trip wire 52 will mechanically withdraw the fuse member 64 from the clips 62 and 62a in the direction of the arrow C, thus de-activating the electrical circuit controlling the raising of the platform and bringing the upward movement in the direction of the arrow A to a halt.

Figure 2:
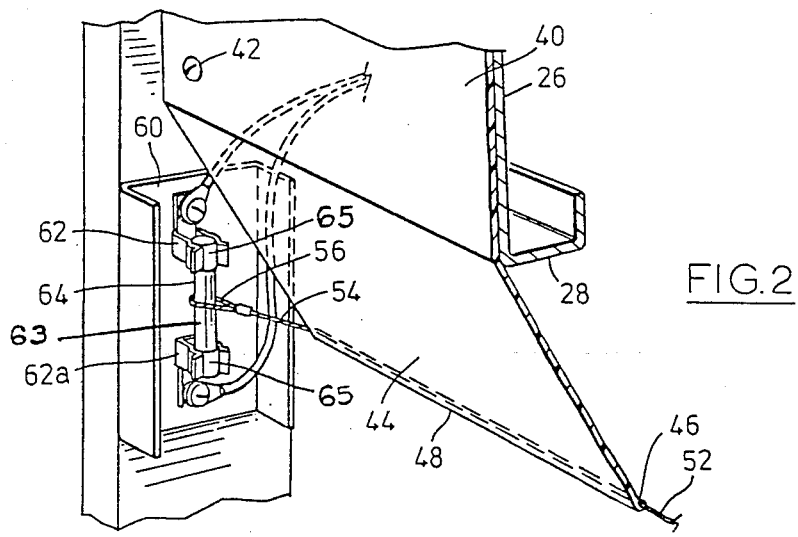
FIG. 2 is an enlarged detailed view of the fuse and trip wire mechanism with the fuse in an operable position.

To re-activate the lifting hydraulic circuit, it is merely necessary to remove the obstruction which caused deflection of the skirt and to replace the fuse in the position shown in FIG. 2 of the drawings.

From the foregoing, it will be apparent that the skirt will bend when it comes in contact with the foot of an operator to the extent that the operator will receive a warning pressure before the circuit breaker is activated, thus permitting the operator to withdraw his foot before the circuit is interrupted.

It will also be apparent that the mechanism used to de-activate the electrical circuit which controls the raising and lowering of the platform is a simple and inexpensive mechanism.

Figure 5:
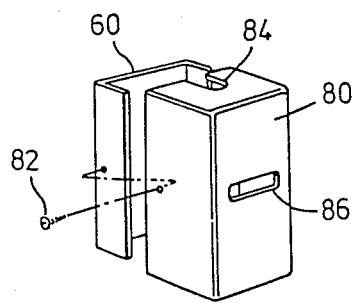
FIG. 5 is a pictorial view of a cover suitable for use in enclosing the fuse support illustrated in FIGS. 1, 2 and 3 of the drawings.

To protect the fuse mounting, a cover plate 80 (FIG. 5) may be provided. The cover 80 being proportioned to fit over the mounting bracket 60 and to be secured thereto by means of mounting screws 82. A notch 84 is provided in the cover plate 80 to permit the electrical lines to gain access to the fuse mounting clips and a passage 86 is provided through which the free ends 54 of the trip wire may extend.

Figure 4:
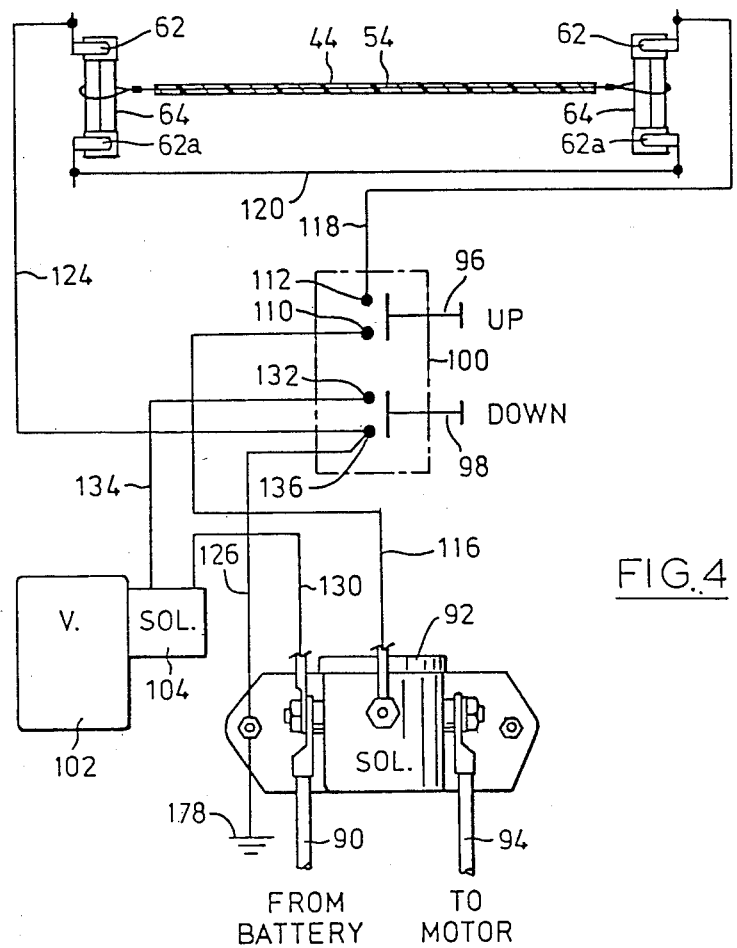
FIG. 4 is a circuit diagram illustrating the electrical control circuits of the present invention.

FIG. 4 of the drawings illustrates a suitable electrical circuit for controlling the operation of the platform in a manner such that the raising of the platform will be interrupted when one or the other of the fuses 64 are removed by activating the trip wire 54. The power source of the electrical circuit is a battery (not shown) which is connected to a solenoid 92 through a cable 90. The solenoid 32 is operable to connect or disconnect the power supply to an output line 94 which is connected to the motor (not shown) of the pump which is used to supply hydraulic fluid to the hydraulic ram to effect raising of the platform. An UP push button 96 and a DOWN push button 98 are provided on a control panel 100 and normally assume an open position. A valve 102 is operated by a solenoid 104 and serves to vent the hydraulic fluid from the ram to permit lowering of the platform.

To raise the platform, the fuses 64 must be operably positioned in the holders 62 and 62a. By depressing the up button 96 to contact the terminals 110 and 112, the solenoid 92 is grounded through the line 116, terminal 110, terminal 112, line 118, fuse 64, line 120, line 124 and line 126 to ground 128. This circuit will remain complete until the push button 96 is released or one or other of the fuses 64 is removed or burns out. If the circuit is broken by removing a fuse 64 or by reason of the glass of the fuse 64 being broken or the fuse wire burning out, power supply to the motor is interrupted and the upward movement of the platform will cease and the platform will come to rest. The platform may then be lowered by depressing the push button 98 which serves to complete the circuit of the solenoid 104. Power passes to the solenoid 104 through line 130 and form the solenoid 104 to terminal 132 through line 134. The terminal 136 is connected to the ground 128 through line 126. Thus, it will be seen that the raising of the platform can be interrupted by breaking the control circuit which controls the operation of the solenoid 92 which in turn controls the operation of the motor which drives the hydraulic pump which drives the hydraulic ram. The interruption of this first circuit does not, however, prevent completion of the circuit required to lower the platform with the result that the platform can be lowered at all times. This is of considerable importance in personal injury situations where the foot or the like of an operator may become lodged in the nip. By reason of the fact that it is possible to operate the lowering circuit independently of the raising circuit, it is possible to lower the platform to open the nip.

In use, if the toe of an operator is positioned as shown in FIGS. 1 and 3 of the drawings as the platform is raised in the direction of the arrow A, the tow 70 will strike the skirt 44 as the platform is raised causing the trip wire 54 to remove the fuse 64 from the circuit or to break the fuse so that the circuit which controls the raising of the platform is broken and the raising of the platform comes to a halt. The platform can then be lowered by depressing the push button 98 which serves to vent the hydraulic ram and allows the platform to be lowered under its own weight thereby opening the nip to release any object which may be gripped therein. Thereafter, in order to re-activate the lifting circuit, it is necessary to replace the fuses 64.

The use of a conventional glass fuse has a number of advantages over microswitches and other circuit breakers. This type of safety mechanism may not be required to function for long periods of time with the result the fuse member may become corroded and substantially welded to the mounting clip. In these circumstances and in circumstances where the fuse member may be frozen to the mounting clip, the glass body of the fuse will nevertheless break under the influence of the trip wire and de-activate the circuit regardless of the condition of the clamp.

From the foregoing it will be apparent that the present invention provides a simple and efficient mechanism for interrupting the raising of the platform. The mechanism is such that it can be reset by the truck operator with ease merely by replacing a conventional electrical fuse.

Various modifications of the present invention will be apparent to those skilled in the art. For example, the same trip mechanism may be used to control the operation of a loading platform of the type which is powered by the conventional power take-off mechanism of a truck. In this type of installation, the engine of the vehicle drives an hydraulic pump which in turn drives the hydraulic lift mechanism of the tailgate loader. By locating any hydraulic valve, of the type which is controlled by an electrical solenoid, in the hydraulic circuit of the tailgate loader, it is possible to use the trip mechanism of the type previously described to interrupt the supply of electrical power to the solenoid to cause the hydraulic valve to relieve the hydraulic pressure supplied to the lifting mechanism of the platform. This will interrupt the raising of the platform. The hydraulic valve may also serve to automatically lower the platform when its electrical solenoid is de-activated. This control system may be achieved by introducing an additional hydraulic valve into the hydraulic circuit or by employing an electrically operated hydraulic control valve to control the raising, lowering and holding of the platform in use.

While the simple glass fuse of the type described above is a preferred form of a circuit breaker, it will be apparent that the trip mechanism of the present invention may be used to activate any convenient form of circuit breaker including an electrical switch. Furthermore, in an elevator device in which the control circuit is pneumatically operated, the circuit breaker may be in the form of a vent valve which may be connected to the flexible skirt by the trip wires as previously described. By activating the vent valve, the pneumatic pressure in the control system may be vented, thereby causing the pneumatic control system to de-activate the lifting mechanism. It will also be apparent that the present invention is applicable to elevator devices for loading platforms which are electro-mechanically operated rather than hydraulically operated in that the hydraulic lift mechanism is not an essential element. The lift mechanism may be activated by a linear actuator mechanism and it need not be hydraulically controlled.

These and other modifications of the present invention will be apparent to those skilled in the art.

The embodiments of the invention in which an exclusive property or privilege is claimed are defined as follows:

1. In an elevator device having first and second platforms mounted in a frame for movement relative to one another wherein a nip is formed between a lower edge of the first platform and an upper edge of the second platform as they move toward one another and wherein an electrically operated control circuit is provided for controlling the movement of the platforms relative to one another, the improvement of:
    (a) a flexible skirt extending below said lower edge of said first platform across the width of said nip whereby during movement of the platform to close the nip, the trip means will be engaged by and deflected by any object which may project into said nip,
    (b) a circuit breaker means operable to de-activate said control circuit, said circuit breaker means comprising a pair of fuse members arranged one at either end of said nip,
    (c) a trip wire extending from each end of the flexible skirt and mechanically engaging each fuse member and being effective to de-activate at least one of said fuse members to de-activate said control circuit when said trip wire is deflected to an extent less than that required to permit said object to be clamped between said first and second platforms to stop the closing of the nip in use.

2. An elevator mechanism as claimed in claim 1, wherein said fuse means further comprises a pair of fuse mounting clips arranged one on either side of said nip, said fuse members being mounted one in each mounting clip, said trip wire engaging said fuse member such that upon deflection of said wire as aforesaid at least one of said fuse members will be removed from its mounting clip to de-activate said circuit.

3. An elevator mechanism as claimed in claim 1, wherein one of said platforms is a lift platform which is hydraulically raised and lowered by means of separate lift and lower hydraulic circuits and wherein said electrically operated control circuit includes first and second electrically operated control circuits for controlling the operation of the lift hydraulic circuit and the lower hydraulic circuit respectively, said fuse means being located in said first electrically operated control circuit whereby de-activating of said first electrically controlled circuit de-activates said lift hydraulic circuit without de-activating said lower hydraulic circuit whereby the lower hydraulic circuit may be activated to lower the lift platform at any time as required in use.

4. In a truck having a lift platform mounted in a frame for raising and lowering a load with respect to the floor of a truck body, wherein a nip if formed between a lower edge of the truck body and an upper edge of the lift platform as the platform is raised and wherein separate lift and lower hydraulic circuits are provided for raising and lowering the lift platform respectively and first and second electrically operated control circuits are provided for controlling the operation of the lift hydraulic circuit and the lower hydraulic circuit respectively, the improvement of;
    (a) a flexible skirt projecting downwardly from said lower edge of said truck body and extending across the width of said nip,
    (b) a trip wire engaging said skirt and extending across said skirt, opposite ends of said trip wire projecting from opposite ends of said skirt,
    (c) a fuse mounting clip in said first electrical circuit mounted on said frame laterally outwardly from each end of said skirt,
    (d) a fuse member mounted in each of said fuse mounting clips,
    (e) said opposite ends of said trip wire being secured, one to each fuse member whereby displacement of said skirt by engagement with an object located in said nip during movement of said platforms toward one another causes said trip wire to break said first electrical circuit by removing at least one fuse from its fuse mounting clip.

* * * * *